Figure 1:
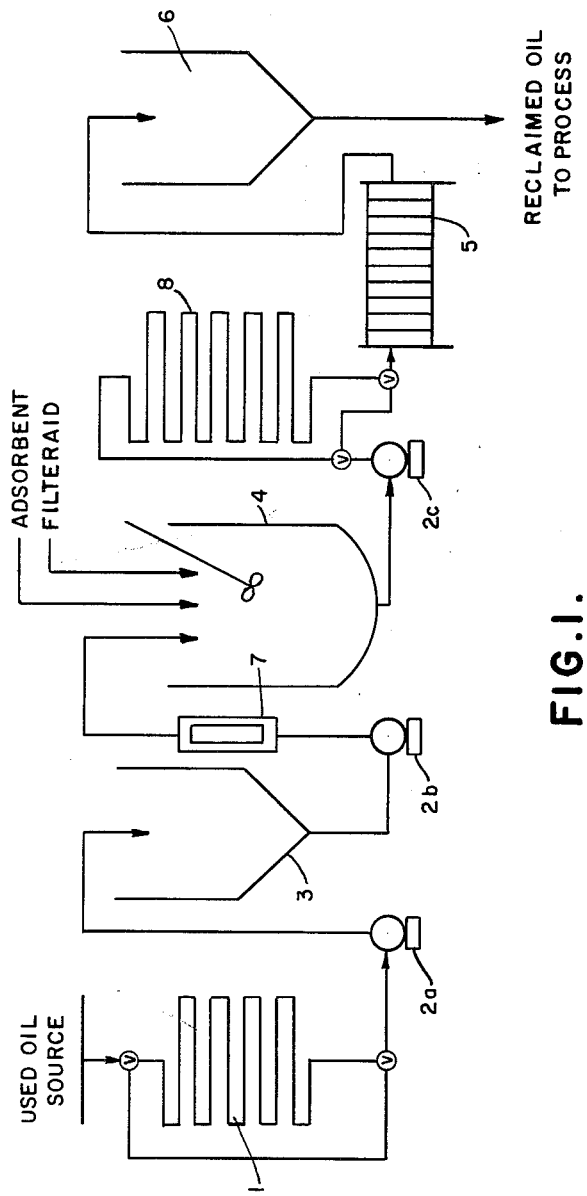

Jan. 25, 1966 E. F. HOOVER 3,231,390
METHOD OF REPURIFYING COOKING OILS USED IN
DEEP-FAT FRYING OPERATIONS
Filed Jan. 18, 1963 2 Sheets-Sheet 1

INVENTOR
Edward F. Hoover

BY
Thomas, Weisman & Russell
ATTORNEYS

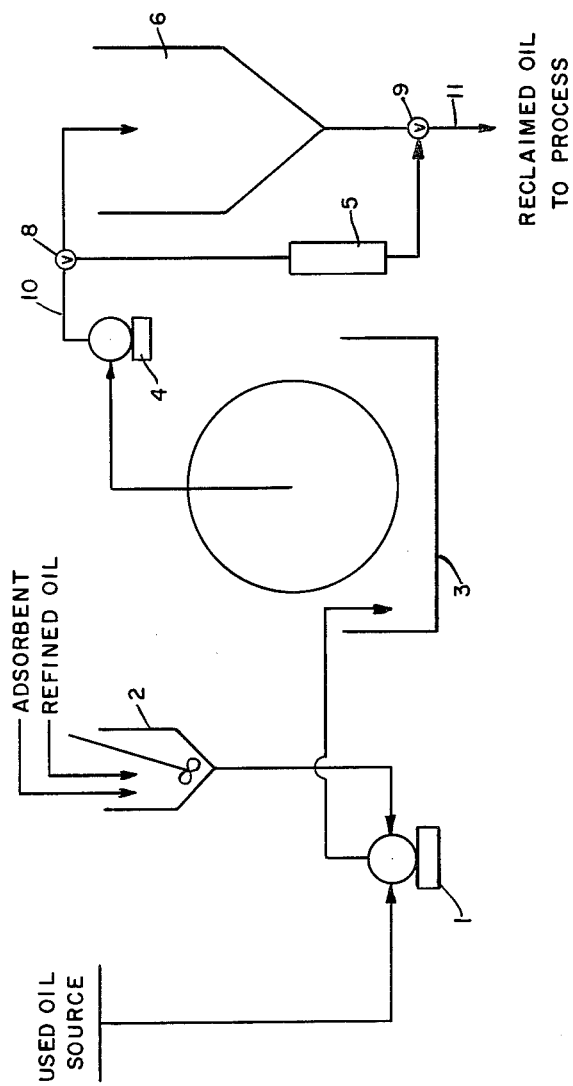

United States Patent Office 3,231,390
Patented Jan. 25, 1966

3,231,390
METHOD OF REPURIFYING COOKING OILS USED IN DEEP-FAT FRYING OPERATIONS
Edward F. Hoover, Berwick, Pa., assignor to Wise Potato Chip Company, Berwick, Pa., a corporation of Pennsylvania
Filed Jan. 18, 1963, Ser. No. 252,352
8 Claims. (Cl. 99—118)

This invention is directed to a process for the upgrading or purifying of vegetable cooking oils which have been used in the cooking or deep-fat frying of edible food products, such as potato chips. In more particular the invention is directed to a process, which may be either batch or continuous, that returns the used vegetable oil to the same, or nearly the same, state it was when unused and freshly refined, with respect to the smoke point and free fatty acid content thereof. Lowering of smoke point during use of the oil and increase in free fatty acid content which also occurs during comparatively high temperature cooking have deleterious effect upon the ultimate cooked product. By the instant process, however, the cooking oil is upgraded to the level existent in freshly refined oils adaptable to this type of cooking procedure; hence with the smoke point and free fatty acid content maintained at the desired level, not only is the ultimate product vastly improved in quality, but also, the cooking oil can be reused over substantially longer periods of time thus resulting in vast economic savings in commercial operation of such industrial phases as the production of cooked potato chips.

Vegetable cooking oils, such as corn and cottonseed oil, are principally composed of triglycerol esters of the higher (16 to 18 carbon atoms) fatty acids called triglycerides. Fatty acids in themselves posses acid characteristics. However, when they are combined with the glyceryl radical, forming triglycerides, the resulting triglycerides are neutral with respect to acidity. Some free fatty acids not combined in triglycerides exist in crude vegetable oils. However, these are nearly completely removed by modern refining methods so that refined commercially available vegetable cookings oils normally contain less than 0.05% free fatty acids.

In the food industry, continuous or semi-continuous deep-fat frying operations such as are used in the processing of potato chips require cooking oils or fats which have been refined to a high level of purity in order to establish and maintain a highly acceptable quality of the finished product.

The nature of the deep-fat frying process is such that a progressive degradation of certain qualities of the cooking oil during continuing use has been observed. The characteristics subject to degradation which are of most interest to the potato chip and similar industries are free fatty acids content and smoke point of the given vegetable cooking oil. It is believed that the relatively large amounts of water driven from the product during the process plus the high temperature at which the operation is carried out are largely responsible for the degradation.

Smoke points tend to decrease progressively and free fatty acids content of oils increase progressively during deep-fat processing of foods. It has been observed that foods such as potato chips which are processed in cooking oils and fats having relatively low smoke points and relatively high free fatty acids content tend to have decreased shelf-like characteristics and generally poorer quality than similar products prepared with highest quality cooking oils. Unused, refined vegetable cookings oils such as corn oil or cottonseed oil having smoke points on the order of 440° F. and free fatty acids contents of from about 0.01% to 0.05% may, after use in continuous, commercial deep-fat frying operations, possess smoke points on the order of about 340–370° F. and free fatty acids contents of about 0.20–0.50%. It is desirable to maintain the smoke point and free fatty acids content of vegetable cookings oils as close to the levels found in unused, refined oils as possible during deep-fat frying operations such as are involved in the manufacture of potato chips. Ability to maintain smoke points of about 410–420° F. and free fatty acids contents less than about 0.10% during continuous or semi-continuous commercial deep-fat frying operations would be most desirable.

It is well known that an inverse relationship exists between the smoke point of vegetable cooking oils, such as corn or cottonseed oil, and the free fatty acids content thereof. It is also believed that free fatty acids are the precursors of the products of oxidation which lead eventually to rancidity in an oil. Sharp differentiation is here drawn between the chemical mechanisms which result in rancidity and those responsible for the so-called flavor and odor "reversion" which occurs most readily in oils of high linolenic acid content such as soybean and linseed oils. Relative levels of free fatty acids and the corresponding smoke points of the oils as referred to in the present invention have no relation to the flavor "reversion" characteristics of some vegetable oils.

Inasmuch as the processing of foods such as potato chips in cooking oils having low smoke points and relatively high free fatty acids content could contribute to decreased shelf-life and generally poorer quality in the foods, it is obvious that a method of repurifying or refinings these oils during use so as to maintain a higher smoke point and a lower free fatty acid level would be of great value in promoting better quality and longer shelf-life.

Methods of accomplishing this, which involve steam stripping of the oil under reduced pressures are commerically available under the generally used term, deodorization processes. These methods, however, require the use of superheated steam and rather specialized vacuum equipment. In addition, the techniques are time consuming, requiring up to several hours for completion of the treatment of the oil.

The present invention relates to the treatment of vegetable cooking oils such as corn and cottonseed which have been subjected to use in the deep-fat frying of foods. By means of the process herein described, such oils can be easily and quickly treated to restore the smoke point and free fatty acids level nearly to the point found in commercially refined, unused vegetable cooking oils. Thus, cooking oils of the type described can be withdrawn during continuous, semi-continuous or batch-type deep-frying operations, treated by the present method to remove excess free fatty acids and improve the smoke point thereof, and returned to the frying process. The cooking oil and the food produced in it will thus attain a higher level of quality.

Accordingly it is a primary object of the instant invention to provide an effective method or process for the purification, upgrading or improvement of vegetable oils which have been used in deep-fat cooking processes; in this respect the process may be either a batch process or a continuous method—in the latter respect the cooking oil being taken directly from the cooking vessel during the cooking operation, purified to increase the smoke point thereof to the required extent and to decrease the free fatty acid content to the desired extent, and then continuously recycled to the cooking vessel.

It is another object of the invention to provide a process of the described type which represents the essence of simplicity, may be quickly performed in either a batch or continuous fashion, is not subject to extreme temperature or pressure gradients but on the contrary, may be performed at room temperature over a period of a very few minutes. In this same light also the process is conducive to the use of more or less standard and available equipment and thus subject to comparatively low cost installation in the type of industrial plant here under consideration.

Finally, it is a primary and main objective of the invention to provide a process for the regrading or purifying of used cooking oil which achieves these ultimate and desirable functions and results: maintenance of a body of vegetable cooking oil, despite degradation thereof due to the relatively high temperatures thereof, at the desirable level of free fatty acid content and correspondingly, at the most desirable smoke point level. Both of these factors are important with respect to the ultimate cooked product: at lower smoke points of the oil and at increased free fatty acid (FFA) content the produce is deleteriously affected—inter alia, the chip may exhibit a different and undesirable odor and its shelf life is substantially reduced. Such is in contrast to that exhibited by the product where cooking is performed with a fresh oil or an oil which is continuously upgraded to maintain its FFA content and smoke point within the desired range. In line with this same objective is the further substantial advantage of the instant invention—that the required quantity of freshly refined vegetable cooking oil in a given plant operation is substantially reduced, for its effective life, as a cooking medium, is increased manyfold.

The present method of repurifying the cooking oils may be briefly described as follows. The oil to be treated is withdrawn from the deep-fat frying process, admixed with a predetermined quantity of a suitable adsorbent material selected from a group of alkaline earth oxides or carbonates for a period of from about five to about fifteen minutes, then subjected to filtration or centrifugation to remove the adsorbent. The clarified oil may then be returned to the frying operation for further use.

By means of this treatment, free fatty acids and other contaminating materials which contribute to low smoke points are adsorbed by the adsorbent material and thus are effectively removed from the oil. Any of a number of compounds of the groups known as alkaline earth oxides or carbonates are suitable adsorbents, although the preferred compounds are magnesium oxide, calcium oxide, or magnesium carbonate. Commercially available grades of these compounds are generally quite acceptable for use as the adsorbent in this process. They require no preliminary treatment prior to their use.

The process of this invention will be more particularly described with respect to the accompanying drawings or flow sheets wherein:

FIGURE 1 illustrates, in diagrammatic or flow sheet form, the process of the invention for the reclamation of used cooking oil of the batch type; and FIGURE 2 illustrates diagrammatically, in flow sheet form, the continuous process of the invention for the reclamation of a used cooking oil.

It is to be observed that the lever of adsorbent required to accomplish effective removal of free fatty acids from used vegetable cooking oils is dependent upon the level of the free fatty acids present. Normally 2% to 7% by weight of adsorbent are required to repurify oils containing 0.2% to 0.5% free fatty acids. Generally a 5% by weight level of adsorbent is sufficient to treat most oils and, accordingly, this is the preferred level.

To accomplish adsorption of free fatty acids within the ranges contemplated by this process, it is necessary for the adsorbent and cooking oil to be in intimate contact for only a minimum length of time, normally from 3 to 15 minutes. A contact time of about 5 minutes is preferred. The relatively short contact time necessary in the present process as compared with the time required by other commercial processes for treating crude or unrefined cooking oils is due, it is believed, to the characteristics of the particular adsorbents specified and to the relatively low levels of free fatty acids encountered here as compared with those found in crude or unrefined oils. Further, it is believed that the adsorption of free fatty acids from a vegetable cooking oil such as is a primary object of the present invention, occurs more rapidly than adsorption of other types of compounds such as those which are responsible for the "reversion" flavor in soybean oil.

The insolubility of the adsorbent in the oil and its relative weight make it necessary that the oil/adsorbent mixture be stirred or agitated continuously by suitable mechanical means in order to maintain a uniform suspension of the absorbent.

Contrary to other processes, the method embodied in the present invention may be carried out entirely at atmospheric pressures because of the short contact time between oil and adsorbent required.

Adsorption of free fatty acids and other materials by the adsorbents specified is not dependent upon temperatures. Accordingly, the method embodied in this invention can be carried out at any temperature between 20° C. (68° F.) and 180° C. (356° F.). However, because of advantages gained by filtration of the oil/adsorbent mixture at elevated temperatures at which oil viscosity is reduced, it is preferred that this operation be carried out at about 150° C. (302° F.).

Spent adsorbent must be removed from the repurified oil prior to subjecting the oil to further use in deep-fat frying operations. This may be accomplished by means of a high speed, continuous centrifugal, or more preferably by means of a vacuum or pressure type filter precoated with a suitable diatomaceous filter acid such as Celite or Dicalite. In the latter case, it is advantageous to add a filter aid (1–3% by weight) to the oil prior to filtering in addition to the precoat on the filter in order to enhance filtration speed. For convenience, this may be added to the oil in conjunction with the addition of the adsorbent.

The clarified, repurified oil filtrate, after removal of the adsorbent, exhibits a substantially improved smoke point and free fatty acid levels and may be reintroduced into deep-fat frying operations.

The process of the present invention may be described in more specific terms as follows.

In batchwise operation, as shown in flow sheet form in FIGURE 1, the vegetable cooking oil to be treated is withdrawn from the deep-fat frying operation and pumped by pump 2a into a holding tank 3 of suitable size. If the oil is to be retained for an extended period of time before treatment (several hours), it is advantageous to cool the oil to a temperature of 38° C. (100° F.) or less by means of a suitable heat exchanger 1 to inhibit oxidation. The oil to be treated is pumped from the holding tank 3 by pump 2b through a metering system 7 to the treatment vessel 4 which is equipped with a mixer or agitating device that will maintain the adsorbent material in a state of complete suspension in the oil. The proper quantity (2–7% by weight) of adsorbent (magnesium oxide, calcium oxide, or magnesium carbonate) is added to the oil along with the quantity of diatomaceous filter aid needed to enhance filtration (1–3% by weight).

The oil/adsorbent mixture is maintained under constant agitation at atmospheric pressure throughout the period of time it is in the mixing tank 4. After five minutes have elapsed, following introduction of adsorbent and filter aid into the oil, the mixture is pumped by pump 2c from the mixing tank. If the oil was previously cooled, it is advantageous to pass the oil/adsorbent mixture through an additional and suitable heat exchanger 8 to raise its temperature to 120–150° C. (250–300° F.) in order to facilitate filtration. However, if the oil was treated with adsorbent while hot, preheating prior to filtration would not be necessary. Removal of the adsorbent and filter aid from the treated oil is accomplished by passing the mixture through a suitable pressure or vacuum-type filter 5 which has been precoated with filter aid. The clarified filtrate oil is passed into a separate holding tank 6 for redistribution to the deep-fat frying operation and reuse.

The process embodied in this invention may also be used in continuous operation, diagrammatically depicted in FIGURE 2 and described as follows:

The vegetable oil to be treated is withdrawn from the deep-fat frying operation in a continuous stream and passed through a suitable proportioning pump 1 where it is combined with a flow of a suspension of adsorbent (magnesium oxide, calcium oxide or magnesium carbonate) in refined vegetable cooking oil, the latter having been admixed in slurry tank 2. The level of adsorbent suspended in the refined oil and the quantity of the suspension added to the stream of oil to be treated should be adjusted so that the levels of adsorbent in the treated oil are within the 2–7% by weight range specified in the batch-type treatment. The suspension of adsorbent is prepared in refined vegetable cooking oil having low free fatty acids content and high smoke point in order to minimize exhaustion of the capacity of the adsorbent. This may be either unused refined oil or oil which has been repurified by the present process. Following addition of the adsorbent, the oil stream is taken to a continuously operating centrifuge or filter 3 having a through-put capacity equivalent to the flow rate of the oil stream being treated. A vacuum, precoat-type filter is preferred. The filter 3 removes the adsorbent as well as other suspended solid material which normally accumulates during the deep-fat processing of foods such as potato chips. The filtered oil possesses the desired improved qualities and may be returned directly to the deep-fat frying operation. Alternately, the oil may be cooled to room temperature and stored pending reuse. In any event, as shown in FIGURE 2, the oil is removed from filter 3 by means of pump 4 and discharged through line 10 to a holding or surge tank 6. From the latter it may be discharged through line 11 directly back to the cooking vessel. Preferably, through suitable valves 8 and 9 an intermediate flow or level control 5 is positioned between inlet line 10 and discharge line 11.

In the continuous-type treatment such as described here, it is assumed that the entire operation will be carried out while the oil is hot. However, this is not a restrictive feature of the process and it may be carried out at room temperature if desired. In this case, cooling would be accomplished by suitable heat exchangers installed prior to the proportioning pump, and as indicated in FIGURE 1 with respect to the batch process.

Treatment of used vegetable cooking oils by the present process, utilizing magnesium oxide, magnesium carbonate or calcium oxide as the adsorbent, does not result in any significant decolorization of the oil such as would be realized if fuller's earth, bentonite or other adsorbent clay were used. The latter materials are recognized as a well known means of decolorizing refined vegetable oils, but the problem here is far different, in substance, procedure and result from that encountered in mere decolorizing processes.

Used vegetable cooking oils such as corn or cottonseed having free fatty acids levels in the range of 0.3–0.4% and smoke points of 340–360° F. when treated by the process herein described yield repurified products having free fatty acids levels of 0.05–0.10% and smoke points of 410–420° F. Unused, refined vegetable cooking oils of commercial grade generally possess free fatty acids levels of 0.02–0.05% and smoke points of 420–440° F. Thus the used oil treated by the present process is substantially restored to the condition of unused, refined cooking oil with respect to these characteristics. The resultant cooked product is thereby substantially improved in taste, appearance and quality.

The following examples are further illustrative of the practice of the invention:

*Example I*

One liter (920 grams) of used corn oil having free fatty acids content (FFA) of 0.28% and smoke point (SP) of 346° F. was agitated in the presence of 46 grams of magnesium oxide for five minutes while maintained at a temperature of 300° F. At the end of this time, 25 grams of Celite 545 filter aid were added and the mixture filtered through paper on a Buchner funnel by means of vacuum. The filtered oil exhibited a smoke point of 414° F. and a free fatty acids content of 0.09%.

*Example II*

One liter of used corn oil (FFA, 0.27%; SP, 350° F.) was treated for five minutes at room temperature with 46 grams of finely powdered calcium oxide (Fischer reagent grade). The slurry was decanted and filtered through paper on a Buchner funnel with the aid of vacuum. The filtered, repurified oil exhibited a smoke point of 410° F. and free fatty acids content of 0.07%.

*Example III*

One thousand grams of used cottonseed oil having SP of 372° F. and FFA of 0.16 were treated for five minutes with a mixture consisting of 50 grams of magnesium carbonate (USP light) and 30 grams of Celite 545 filter aid. The slurry was agitated by mechanical stirring and was held at a temperature of 300° F. throughout the treatment. After five minutes the mixture was filtered with the Buchner funnel through paper precoated with filter aid. Vacuum was used to facilitate filtration. The clarified filtrate exhibited a smoke point of 420° F. and free fatty acids content of 0.03%.

*Example IV*

Five hundred fifty gallons (4,250 pounds) of used cottonseed oil having a smoke point of 360° F. and a free fatty acids content of 0.25% are withdrawn from the deep-fat frying operation at a temperature of 365° F. and pumped through a surge tank into a reaction vessel of about 700 gallons capacity equipped with a mechanical agitation device. The temperature of the oil in the reactor vessel drops to about 300° F. during transfer. Agitation is begun and 212 pounds of magnesium oxide (Maglite "K") are added to the oil along with 85 pounds of filter aid (Hyflo Super-Cel). After five minutes, during which time constant agitation is maintained, the oil/magnesia/filter aid mixture is discharged from the reactor vessel and pumped through a plate and frame type filter press, which has previously been properly precoated with filter aid, recycling the initial portions of the filtrate until the maximum clarity had been obtained. The clarified oil is passed through a water cooled heat exchanger to reduce its temperature to less than 120° F. and collected in 1,500 gallon holding tank pending reuse in the deep-fat frying operation. The clarified oil possesses a smoke of 410° F. and a free fatty acids content of 0.06%.

*Example V*

Used cottonseed cooking oil is withdrawn from the deep-fat frying operation at a constant rate of 10 gallons per minute. The oil possesses a free fatty acids content of 0.20% and a smoke point of 370° F. The temperature of the oil is about 365° F. This is passed through a proportioning pump where it is mixed with 1.0 gallon per minute of a slurry of unused refined cottonseed oil containing 2.3 pounds of magnesium oxide (Maglite "K," Merck & Co.) per gallon. The adsorbent/oil slurry is prepared and held in a separate supply tank and is continuously agitated in order to maintain uniform suspension of the adsorbent in the oil. The proportioning rate creates a 3% by weight level of adsorbent in the oil stream discharged from the pump. This is passed directly to the supply basin of a continuous rotary precoat vacuum filter having a filtering capacity of 700 gallons per hour. The adsorbent added by the proportioning system, as well as any suspended solid materials which are contained in the stream of used oil as it is withdrawn from the frying operation, is removed on the filter. The time required after addition of the adsorbent for the oil to pass from the proportioning pump into the supply basin of the filter and thence through the filter is sufficient to allow adsorption of the free fatty acids and other compounds contributing to low smoke points on the magnesium oxide. The filtered oil is free of suspended solids and possesses a free fatty acids content of 0.07% and a smoke point of 400° F. It passes directly from the continuous vacuum filter through a level control or surge tank and is returned to the deep-fat frying operation.

From the foregoing description and reference to the specific examples illustrative of the preferred practice of the invention, it will be seen that I have provided a most simplified, economical and rapid method for the upgrading or refinement of a used vegetable cooking oil, enabling that oil to be resued over a substantial period of time in a given type of deep-fat frying procedure. The primary concept of the invention is directed to the unique consideration that inferior products result from continuous or prolonged use of a given cooking oil by reason of its lowered smoke point and increased free fatty acid content, both of which factors are consequent upon subjection to relatively high temperatures for comparatively long periods of time. In ordinary and known processes the only solution to this probelm lies either in the continuous or frequent replenishment of the cooking oil, or in methods too expensive or difficult to be commercially feasible. In plants of considerable production the type of oil suitable for use in such deep-fat frying procedures is relatively expensive. When the same is retrograded by the cooking process and therefore must be discarded, greater expense is obviously encountered in continuous replenishment of the cooking oil by freshly refined oil. By the instant process, however, replenishment is far less frequent, the oil may be continuously used over a prolonged period of time. At the same time, the product exhibits those quality factors which are present in the cooking procedure when a freshly refined oil of proper smoke point and free fatty acid content is utilized.

It is manifest that other expedients and alternates may be employed in carrying out the concept of the invention, other than those more specifically referred to in the foregoing; however, the invention is not to be deemed restricted in scope except as the same may be limited by the limitations found in the claims appended hereto.

I claim:

1. A process for the purification of used vegetable cooking oils employed in deep fat frying, said oils having a free fatty acid content in excess of about 0.20% and a smoke point from about 340° F. to about 370° F., comprising admixing said oils with an adsorbent material at atmospheric pressures in an amount of from about 2% to about 7% by weight, said adsorbent being selected from the group consisting of an alkaline earth metal carbonate and an alkaline earth metal oxide consisting of alkaline earth metal and oxygen for a period of time of from about three to about fifteen minutes to reduce said free fatty acid content to below about 0.10% and to increase said smoke point thereof to in excess of about 410° F., said oils being at a temperature of from about 68° F. to 356° F. and removing said adsorbent from said oils by mechanical agents, whereby the fatty acid content of said used oils is reduced to below about 0.10% without substantial saponification and said smoke point thereof is increased to in excess of about 410° F.

2. A continuous process for the purification of used vegetable cooking oils employed in a deep fat frying bath, said used oils having a free fatty acid content of from about 0.20% to 0.50% and a smoke point of from about 340° F. to about 370° F., comprising continuously removing said oils from said deep fat frying bath, continuously admixing with fresh unused vegetable cooking oil an adsorbent selected from the group consisting of alkaline earth carbonate and an alkaline earth metal oxide consisting of alkaline earth metal and oxygen to form a fresh oil-adsorbent mixture at atmospheric pressure, said adsorbent material being present in an amount of from about 2% to about 7% by weight of said used oils, said used oils being contacted with said fresh oil-adsorbent mixture over a period of time of from about three to about fifteen minutes, said used oils being at a temperature of from about 68° F. to 356° F. and continuously removing said adsorbent from said used oils by mechanical separation whereby the fatty acid content of said used oils is reduced to below about 0.10% without substantial saponification and said smoke point thereof is increased to in excess of about 410° F.

3. The process as defined in claim 1 wherein said adsorbent is magnesium oxide.

4. The process as defined in claim 1 wherein said adsorbent is calcium oxide.

5. The process as defined in claim 1 wherein said adsorbent is magnesium carbonate.

6. The process as defined in claim 1 wherein said adsorbent is added in an amount of about 5% and said period of time is about five minutes.

7. The continuous process as defined in claim 2 wherein said used oils and said fresh oil-adsorbent admixture are contacted at a temperature of about 150° C.

8. The continuous process as defined in claim 2 wherein said used oils are continuously recycled to said deep fat frying bath after said adsorbent removal step.

References Cited by the Examiner

UNITED STATES PATENTS

| | | | |
|---|---|---|---|
| 722,832 | 3/1903 | Fresenius | 260—425 |
| 1,386,471 | 8/1921 | Tuttle et al. | |
| 2,454,937 | 11/1948 | Moyer et al. | 260—425 |
| 2,733,253 | 1/1956 | Milbers et al. | 260—425 |
| 2,767,095 | 10/1956 | Smith | 99—100 |
| 2,795,595 | 1/1957 | Elston | 260—425 |

FOREIGN PATENTS 451,730  8/1936  Great Britain.

OTHER REFERENCES

Bailey: "Industrial Oil and Fat Products," 1951, Interscience Publ., Inc., New York, p. 310.

A. LOUIS MONACELL, *Primary Examiner.*